United States Patent [19]

Dutta

[11] Patent Number: 5,294,133
[45] Date of Patent: Mar. 15, 1994

[54] FLUID-FILLED O-RING FOR MAINTAINING A SEAL UNDER LOW TEMPERATURE CONDITIONS

[75] Inventor: Piyush K. Dutta, Lebanon, N.H.

[73] Assignee: The United States of America as represented by the Secretary of the Army, Washington, D.C.

[21] Appl. No.: 757,400

[22] Filed: Sep. 10, 1991

[51] Int. Cl.5 .............................................. F16J 15/46
[52] U.S. Cl. ........................................... 277/26; 277/226
[58] Field of Search .................. 277/26, 135, 226, 165

[56] References Cited

U.S. PATENT DOCUMENTS

| 829,546 | 8/1906 | Schon | 277/226 |
|---|---|---|---|
| 1,966,202 | 7/1934 | Pfefferle | 277/226 |
| 2,353,977 | 7/1944 | Thornhill | 277/165 |
| 2,688,436 | 9/1954 | Melaven | 277/34 |
| 2,784,013 | 5/1957 | Groen | 277/165 |
| 2,861,712 | 11/1958 | Bermingham | 277/226 |
| 2,877,071 | 5/1959 | Arnot | 277/165 |
| 2,914,350 | 11/1959 | Smith | 277/226 |
| 3,007,600 | 11/1961 | Horner | 277/26 |
| 3,033,578 | 5/1962 | Kellogg | 277/165 |
| 3,057,629 | 10/1962 | Sneed | 277/165 |
| 3,149,848 | 9/1964 | Galloway | 277/226 |
| 3,520,543 | 7/1970 | Etter et al. | 277/226 |
| 4,865,331 | 9/1989 | Porter | 277/26 |
| 4,913,472 | 4/1990 | Janakirama-Rao | 277/26 X |
| 4,987,826 | 1/1991 | Deppert et al. | 277/152 X |

FOREIGN PATENT DOCUMENTS

| 0241706 | 12/1962 | Australia | 277/226 |
|---|---|---|---|
| 0408834 | 1/1925 | Fed. Rep. of Germany | 277/26 |
| 0891479 | 7/1949 | Fed. Rep. of Germany | 277/226 |
| 0543184 | 5/1956 | Italy | 277/226 |
| 0028057 | 2/1983 | Japan | 277/236 |
| 0136060 | 6/1986 | Japan | 277/26 |
| 1126753 | 11/1984 | U.S.S.R. | 277/26 |
| 0143168 | 5/1920 | United Kingdom | 277/26 |
| 0528359 | 10/1940 | United Kingdom | 277/226 |
| 0927629 | 5/1963 | United Kingdom | 277/226 |
| 0970696 | 6/1964 | United Kingdom | 277/226 |

OTHER PUBLICATIONS

"Bimetallic Seal Solves Cryogenic Sealing Problems", by William A. Prince, Hydraulics and Pneumatics, Nov. 1964, pp. 105–109.

Primary Examiner—William A. Cuchlinski, Jr.
Assistant Examiner—Scott W. Cummings

[57] ABSTRACT

An O-ring seal for sealing two concentric members is disclosed. A hollow ring made from an elastomeric material is provided with a central liquid core. Temperature changes which normally result in a contraction in the elastomer material are compensated by the expansion of the liquid core. The O-ring maintains a sealed condition between the two members over a wider temperature range.

4 Claims, 1 Drawing Sheet

FLUID-FILLED O-RING FOR MAINTAINING A SEAL UNDER LOW TEMPERATURE CONDITIONS

STATEMENT OF GOVERNMENT INTEREST

The invention described and claimed herein may be manufactured and used by or for the Government of the United States of America for governmental purposes without the payment of royalties thereon or therefor.

The present invention is directed to O-ring seals that provide for a pressure tight seal between concentric members. Specifically, an O-ring seal is provided which will maintain a seal between concentric components under low temperature conditions.

O-ring seals are used in the art to maintain a seal between two concentric components. In many applications, the O-ring seal is placed in a precisely machined groove in one of the components. The other component makes contact with the outer diameter of the O-ring seal to form a pressure-tight seal. The degree of sealing depends on how well the O-ring cross-section can deform and deflect from its nominal circular shape to an oval shape. The deflection of the O-ring seal fills any gap around it, resting tightly against the two walls of the components.

These types of seals, which may also be in the form of a square or other cross-sectional geometry, are generally made of an elastomeric material such as rubber. These seals have an inner diameter located within a groove of one of the compartments, the groove being precisely located to establish the right amount of interference between the outside diameter of the seal and an outer concentric surface.

However, elastomeric materials lose their resiliency as the temperature is decreased. At low temperatures, these O-ring seals become hard and brittle and not very effective in sealing between the two concentric components. For instance, the recent disaster of the space shuttle Challenger has been credited to the unusual low temperature experienced at the launch site. The low temperatures decrease the resiliency of the O-rings used in the solid rocket booster, thus rendering the seal ineffective in sealing against the rocket propellant. The consequences of a seal failure under these conditions resulted in a loss of life, as well as property.

It is thus with this problem in mind that the present invention has been proposed.

SUMMARY OF THE INVENTION

It is a primary object of this invention to provide an O-ring seal which is effective at low temperatures.

It is yet another object of this invention to provide for sealing between components which may require a square or other cross-sectional seal member.

It is an object of this invention to provide for a controlled degree of sealing and tightness of an O-ring under a range of temperature conditions.

These and other objects of the invention have been solved through the use of a hollow ring, having an inside dimension equal to the outside dimension of a groove of one of two concentric members to be sealed. The outside diameter of the ring contacts the second of the concentric members to form a conventional seal.

The hollow ring is filled with a fluid forming a liquid core which expands and contracts with temperature changes. In a preferred embodiment of the invention, the fluid has an expansion-temperature characteristic which is negative, compensating for changes in the ring material as a function of temperature. Thus, when an elastomeric material is used as a hollow ring, and a fluid such as water is inserted within the hollow ring at low temperatures the elastomeric material tends to contract, whereas the water will expand, thus compensating for the contraction of the elastomeric material. The inner liquid may be water, or some mixture of water and a glycol to obtain an expansion characteristic which compensates for the expansion characteristics of the elastomeric material.

DESCRIPTION OF THE PREFERRED EMBODIMENT

Figure 1:
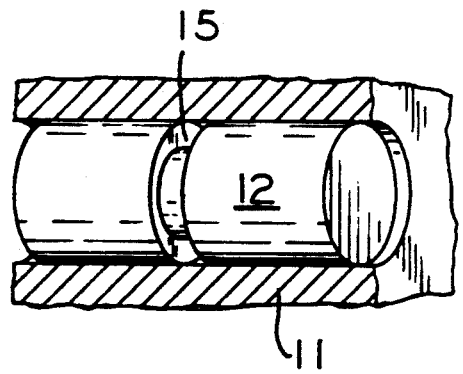
FIG. 1 illustrates a groove 15 and a piston rod 12 which is to be sealed to a bore 11.
Figure 2:
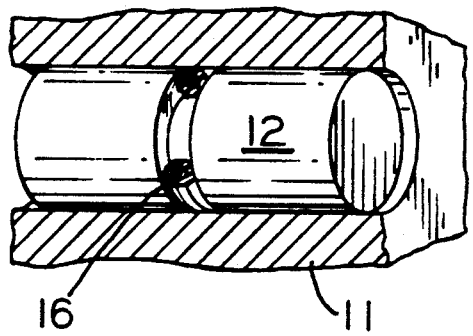
FIG. 2 illustrates the presence of an O-ring in the groove 15 for effecting a seal between the bore 11 and piston 12.

Referring now to FIG. 1, there is shown a cross-section of a cylinder bore which is to be sealed with a piston rod 12. This represents a typical application for an O-ring seal. A precision groove 15 is formed in the first of the concentric members 12, the piston rod, to have a machined depth, which, when the O-ring 16 is shown in FIG. 2, is in place, will provide for sealing between the O-ring and the bottom of the groove 15, and the O-ring and the surface of the bore 11. The dimensions of the groove 15 and the cross-section thickness of the O-ring 16 are selected to be in a precise relationship to obtain the requisite seal. In the event the two members including the bore 11 and piston rod 12 are not exactly concentric, the O-ring will deform in the form of an oval, thus filling any voids which may be present as a result of a lack of concentricity between the bore 11 and the piston 12.

As is known in the prior art, a conventional O-ring 16 will contract with temperature and reduce its flexibility. The degree of sealing changes negatively to the point the seal maybe ineffective, where, at a sufficiently low temperature, a leak occurs between the piston 12 and bore 11.

Figure 3:
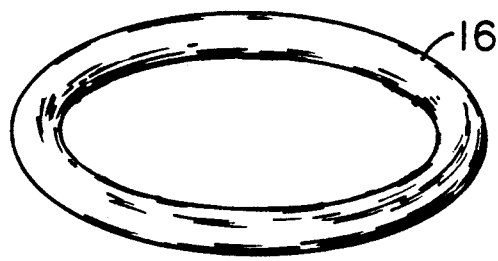
FIG. 3 illustrates the ring which is placed in the groove 15.
Figure 4:
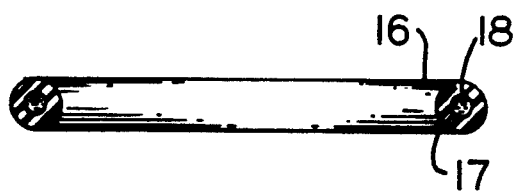
FIG. 4 is a section view of the ring of FIG. 3, illustrating the fluid-filled central core.
Figure 5:
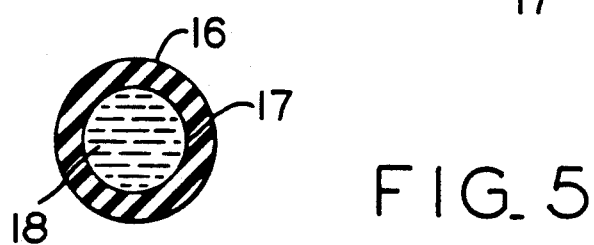
FIG. 5 is an enlarged end view of the section view of FIG. 4.

FIG. 3, the cross-section of FIG. 3 shown in FIG. 4, and the end view of FIG. 3 shown in FIG. 5, illustrate an O-ring in accordance with the invention, which will avoid the foregoing problem at low temperatures. The O-ring 16 has a hollow center 17, which is filled with a fluid 18. The fluid 18 which forms a liquid core is inserted using a conventional syringe and a needle for piercing the outer wall of the O-ring 16. The inserted fluid 18 is selected to have a negative expansion coefficient, particularly at subzero temperatures. In some applications, water may suffice as having a sufficient negative temperature expansion characteristic so as to permit changes in the O-ring material 16, which may be any elastomeric material or rubber, in order that the effective dimensions of the O-ring are maintained.

As can be seen, the expansion of the interior 18 fluid tend to maintain the O-ring at its nominal dimensions.

Further, by selecting a mixture of water and glycol, or other substance, the expansion characteristics of the O-ring under low temperature conditions may be accurately controlled.

The O-ring material, if selected to be an elastomeric material, will be sealed by removing the syringe needle. Where other materials are used for the O-ring it is possible to seal these against leakage with conventional adhesives.

The foregoing embodiment is illustrative of how conventional O-rings may be improved with the addition of the hollow interior and fluid. This is applicable to rings of other cross-sections such as squares, which may be used to seal certain types of concentric structures.

The foregoing O-ring seal may be used in the usual application of sealing containers, components of pressure vessels, pipes and machinery where gas or fluids may be under pressure. The O-ring in accordance with the preferred embodiment will operate at elevated temperatures as a conventional O-ring seal. The seal is maintained when the temperatures drop below the level in which conventional seals fail.

Those skilled in the art will recognize yet other embodiments of the invention as described more particularly by the claims which follow.

What is claimed is:

1. A seal for sealing two concentric members comprising a hollow ring having an inside diameter substantially equal to the outside diameter of a groove in a first one of said members, and an outside diameter substantially equal to an inside diameter of a second one of said members, said hollow ring made of a material that will contract when exposed to changing temperatures, said hollow ring containing a fluid forming a liquid core which expands and contracts with temperature changes, thereby maintaining a seal between said concentric members under various temperature conditions, said fluid having a negative expansion coefficient greater than or equal to the contraction of said ring under low temperatures such that a seal is maintained.

2. The seal of claim 1 wherein said fluid is a mixture of one or more fluids.

3. The seal of claim 1 wherein said hollow ring is made from an elastomer.

4. The seal of claim 3 wherein said fluid is selected to expand at lower temperatures, maintaining said elastomer outer diameter at substantially the same dimension.

* * * * *